(12) United States Patent
Chen et al.

(10) Patent No.: US 9,497,879 B2
(45) Date of Patent: Nov. 15, 2016

(54) SURROUNDING-BUCKLE TYPE MOBILE HARD DRIVE RACK

(71) Applicant: Super Micro Computer Inc., San Jose, CA (US)

(72) Inventors: Richard S. Chen, San Jose, CA (US); Ken-Sheng Lin, San Jose, CA (US); Kuo-Hsien Wang, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 14/929,796

(22) Filed: Nov. 2, 2015

(65) Prior Publication Data

US 2016/0302322 A1 Oct. 13, 2016

Related U.S. Application Data

(63) Continuation-in-part of application No. 14/681,466, filed on Apr. 8, 2015.

(51) Int. Cl.
*A47F 5/00* (2006.01)
*H05K 7/14* (2006.01)
*F16B 2/18* (2006.01)

(52) U.S. Cl.
CPC ............... *H05K 7/1417* (2013.01); *F16B 2/18* (2013.01)

(58) Field of Classification Search
CPC .... H05K 1/1417; H05K 5/0217; F16B 2/18; G11B 33/14; G11B 33/125; G11B 33/124; G06F 1/187; G06F 1/1658; F11B 33/124
USPC .................. 361/679.33, 679.37; 248/315
See application file for complete search history.

(56) References Cited

U.S. PATENT DOCUMENTS

| 2011/0101831 A1* | 5/2011 | Wang | G06F 1/187 312/223.1 |
| 2013/0069503 A1* | 3/2013 | Hu | G11B 33/124 312/223.2 |
| 2015/0146372 A1* | 5/2015 | French, Jr. | H05K 7/1489 361/679.58 |

* cited by examiner

*Primary Examiner* — Christopher E Garft
(74) *Attorney, Agent, or Firm* — Chun-Ming Shih; HDLS IPR Services (57) ABSTRACT

A hard drive rack includes a frame. The frame includes a plurality of plates surrounding to form an accommodating space and at least one insertion opening. The plates include a bottom plate, a cover plate, and a supporting plate. The latch arm of the actuator assembly includes a first buckle part and is pivotally connected to the frame. The buckle arm includes a pivotal end and a hooking end, the buckle arm connects to the bottom plate through the pivotal end and is able to pivotally rotate. The hooking end is formed with a second buckle part which is selectively blocked by the first buckle part to encircle the insertion opening.

9 Claims, 9 Drawing Sheets

SURROUNDING-BUCKLE TYPE MOBILE HARD DRIVE RACK

CROSS-REFERENCE TO RELATED APPLICATION

This application is a continuation-in-part application of U.S. application Ser. No. 14/681,466 filed on Apr. 8, 2015. The entire disclosure is incorporated herein by reference.

BACKGROUND

1. Technical Field

The technical field relates to a hard drive rack, particularly to a surrounding-buckle type mobile hard drive rack.

2. Related Art

With the prevalence of internet and e-commerce, using server with plenty of storage devices (ex. hard drives) to store the backup data has been a common solution for the public.

Nowadays, most of the array storage devices use removable type hard drive. However, screws are essential in most of the fastening means for the conventional hard drive tray, and the hard drive tray is further fixed to the server case by hand tools. Similarly, when removing the hard drive, hand tools are required as well. It is time consuming using hand tools if too many hard drives need to be replaced frequently. Thus, in order to increase the amount of the hard drive to store more electronic information while not taking too much spaces and costing too much, a new mobile hard drive accommodating device is necessary.

BRIEF SUMMARY

The purpose of a preferred embodiment of the present invention is to provide a surrounding-buckle type mobile hard drive rack, which fixes the hard drive into the rack by surroundingly buckling the frames, the actuator assembly, and the buckle arm, and the user can easily replace the hard drive without using any tools, so as to achieve the goal of quick assembling and disassembling.

In order to achieve the aforementioned purpose, a preferred embodiment of the present invention provides a surrounding-buckle type mobile hard drive rack, which includes a frame, and actuator assembly, and a buckle arm. The frame includes a plurality of plates, an accommodating space and at least one insertion opening surrounded by the plurality of plates; the plurality of plates includes a bottom plate and a cover plate disposed on opposite sides of the accommodating space, and a supporting plate connects the bottom plate and the cover plate. The actuator assembly is disposed on the cover plate, the actuator assembly includes an elastic element and a latch arm; one end of the latch arm is formed with a first buckle part. The buckle arm movably and pivotally connects one side of the frame; the buckle arm has a pivotal end and a hooking end, the buckle arm pivotally connected to the bottom plate through the pivotal end, a second buckle part being formed on the hooking end and selectively connected to the insertion opening by buckling with the first buckle part to encircle the insertion opening.

Another purpose of the preferred embodiment of the present invention is to provide a surrounding-buckle type mobile hard drive rack, and the frame is designed as pierced frame which is good for ventilation, thereby improving the heat dissipating efficiency.

Compared to the conventional technique, the frame of the surrounding-buckle type mobile hard drive rack according to the preferred embodiment of the present invention has an insertion opening, and the actuator assembly and the buckle arm are movably connected to the frame. The main embodiment of the present invention is to use the actuator assembly (including the elastic element and the latch arm) to buckle with the buckle arm. As such, the frame, the actuator assembly, and the buckle arm can fix the hard drive in the rack by a surrounding-buckle means. When pressing the actuator assembly to release the buckle arm from the actuator assembly, the users do not need to use any tools and is able to easily remove the hard drive from the frame, so as to achieve the goal of quick assembling and improve the convenience and practicability in using.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring to FIGS. 1 to 4, the surrounding-buckle type mobile hard drive rack 1 according to the preferred embodiment of the present invention is used for holding a hard drive 2. The surrounding-buckle type mobile hard drive rack 1 includes a frame 10, an actuator assembly 20, and a buckle arm 30. The buckle arm 30 is pivotally connected to the frame 10 and is able to rotate to open or close relative to the frame 10 by the moving of the actuator assembly 20.

The frame 10 includes a plurality of plates 11, the plates 11 surround to from an accommodating space 100 and at least one insertion opening 101. In a preferred embodiment of the present invention, at least one side of the accommodating space 100 is the insertion opening 101.

In a preferred embodiment of the present invention, the frame 10 is a U-shaped frame. The plates 11 include a bottom plate 111 and a cover plate 112 disposed on opposite sides of the accommodating space 100, and a supporting plate 113 connecting the bottom plate 111 and the cover plate 112. Furthermore, the bottom plate 111 and the cover plate 112 are connected to both ends of the supporting plate 113, respectively.

The actuator assembly 20 is disposed on the cover plate 112. The actuator assembly 20 includes an elastic element 21 and a latch arm being able to swing back-and-forth through the elastic element. Besides, one side of the latch arm has a first buckle part 221. In the preferred embodiment of the present invention, the elastic element 21 is a torsion spring, but not limited thereto. The elastic element 21 can provide restoring force, which makes the latch arm move back to initial position after the outer force applied thereto is removed.

The buckle arm 30 is movably and pivotally connected to a side of the frame 10. The buckle arm has a pivotal end 31 and a hooking end 32. The buckle arm 30 connects to the bottom plate 111 via the pivotal end 31 and is able to pivotally rotate. Besides, the hooking end 32 is formed with a second buckle part 321 which is selectively buckled by the first buckle part 221 of the latch arm 22 to enclose the insertion opening 101. Preferably, the first buckle part 221 is a latching block, and the second buckle part 321 is a hook. The latching block and the hook have a bevel respectively to facilitate the positioning of the latching block and the hook. Detailed description of the connection means of the actuator assembly 20 and the buckle arm 30 is shown below.

Figure 1:
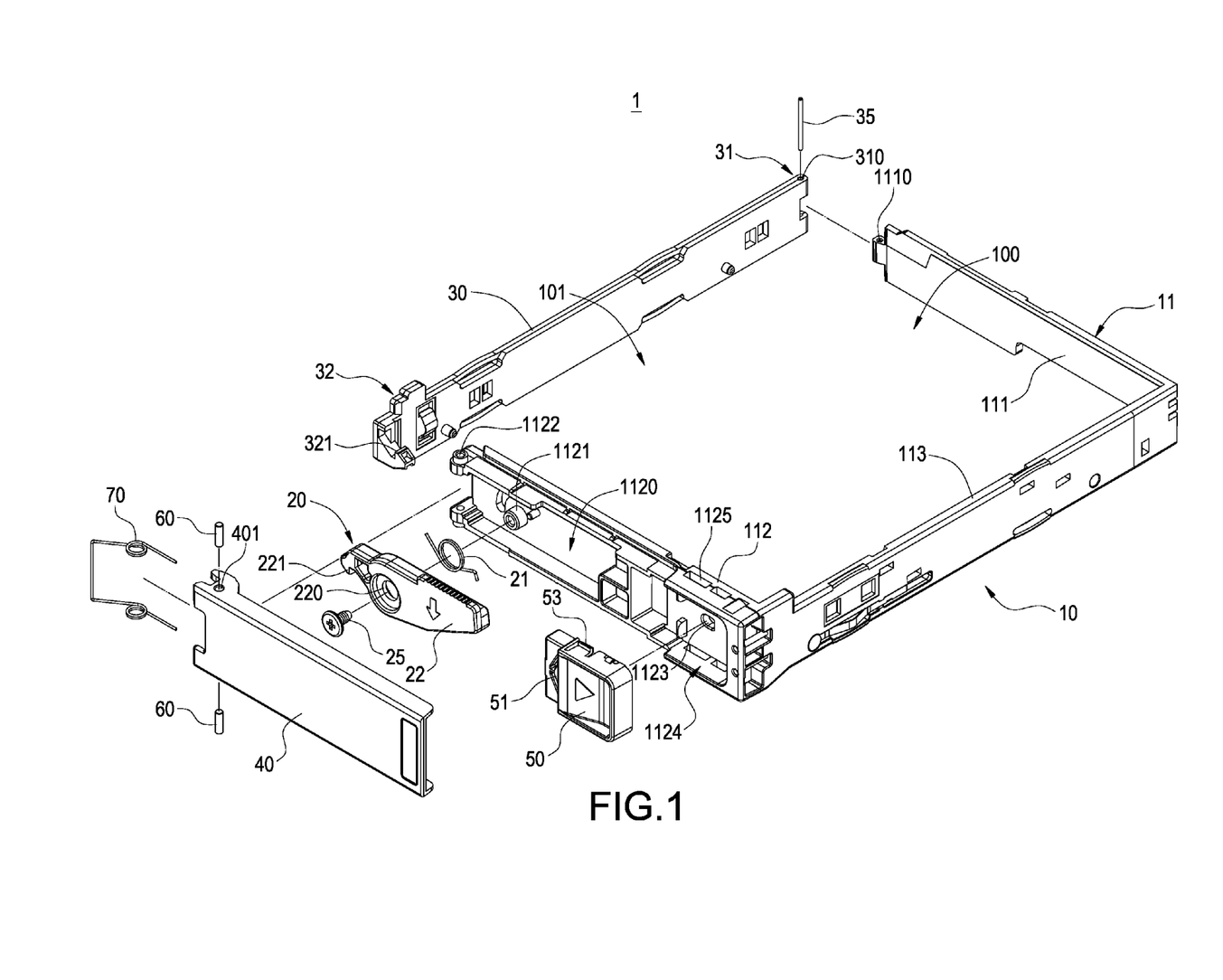
FIG. 1 is an exploded perspective side view of a preferred embodiment of the surrounding-buckle type mobile hard drive rack according to the present invention.
Figure 2:
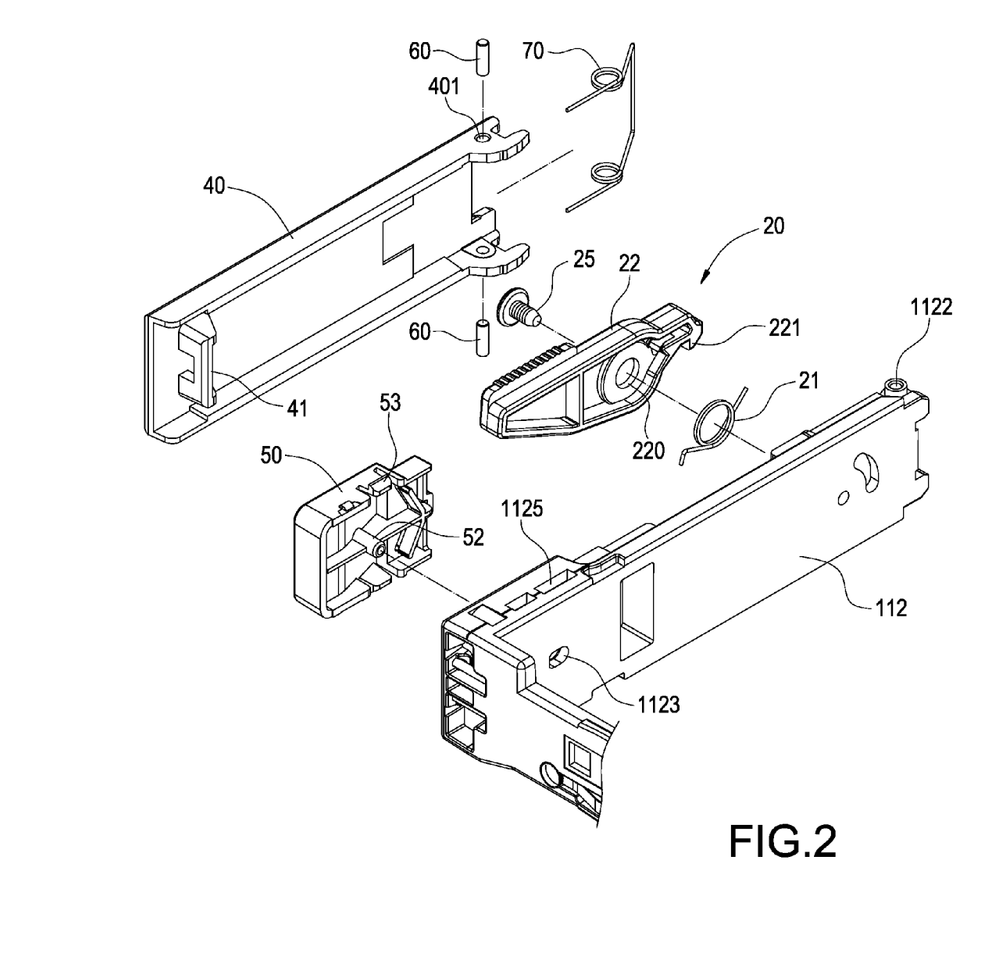
FIG. 2 is a partial exploded perspective view of another side of the preferred embodiment of the surrounding-buckle type mobile hard drive rack according to the present invention.
Figure 3:
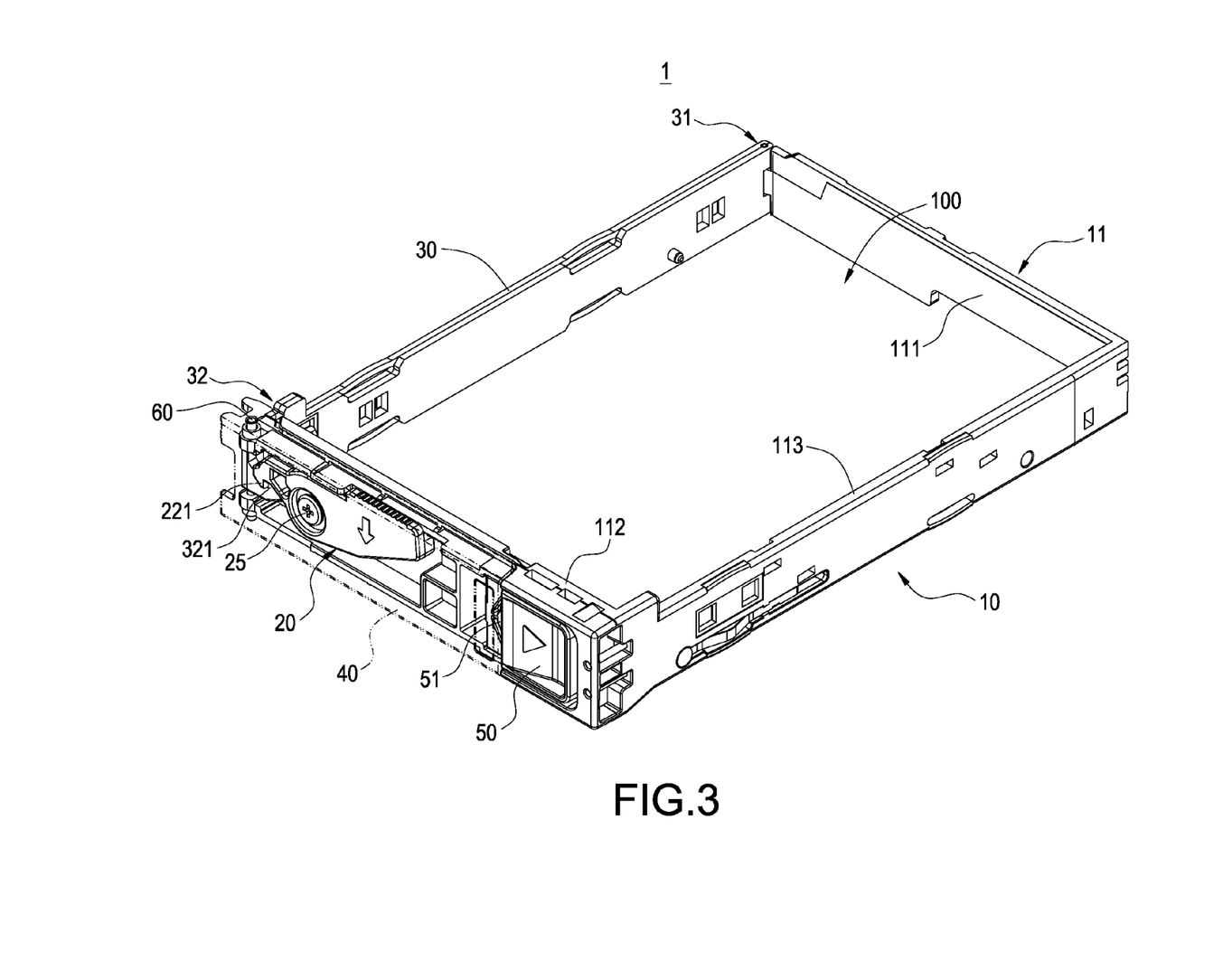
FIG. 3 is a perspective schematic view of a preferred embodiment of the surrounding-buckle type mobile hard drive rack according to the present invention.
Figure 4:
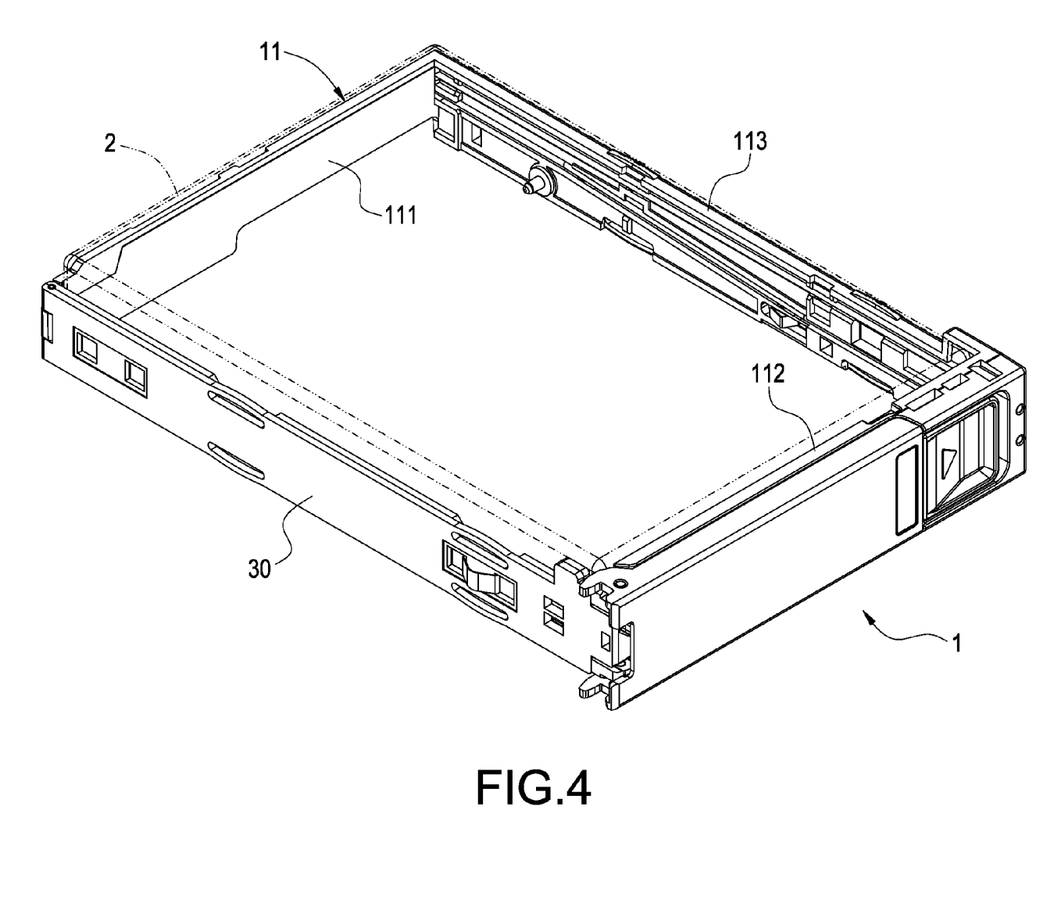
FIG. 4 is a perspective schematic view of a preferred embodiment of the surrounding-buckle type mobile hard drive rack after assembling with the hard drive according to the present invention.

In the preferred embodiment of the present invention, the surrounding-buckle type mobile hard drive rack 1 further includes a first shaft 35. The pivotal end 31 of the buckle arm 30 is provided with a first through hole 310. Besides, a first shaft hole 1110 is formed on an end of the bottom plate 111 adjacent to the buckle arm 30. The buckle arm 30 is connected to the first through hole 310 and the first shaft hole 1110 via the first shaft 35 and thus is able to pivotally rotate relative to the bottom plate 111.

In one preferred embodiment of the present invention, the cover plate 112 is formed with first accommodating space 1120 at one side where the actuator assembly 20 is connected. Besides, The cover plate 112 is formed with a stud 1121 in the first accommodating space 1120. Moreover, the latch arm 22 of the actuator assembly 20 is provided with a penetrating hole 220. The latch arm 22 is connected to the penetrating hole 220 and the stud 1121 by a screw 25 to movably connect to the cover plate 112.

Furthermore, the surrounding-buckle type mobile hard drive rack 1 further includes a pulling handle 40 and a moving key 50. The pulling handle 40 can facilitate applying force by the user, so as to take out the surrounding-buckle type mobile hard drive rack 1 from a case of a server. Besides, the moving key 50 is used to buckle the pulling handle 40 to prevent the pulling handle 40 from accidentally being pulled out by an outer force.

Besides, the surrounding-buckle type mobile hard drive rack 1 further includes a pair of second shafts 60 and a spring 70. The cover plate 112 is formed with a pair of second shaft hole 1122 at an end being connected to the actuator assembly 20. Moreover, one end of the pulling handle 40 is provided with a pair of second through hole 401. The pulling handle 40 connects to the corresponding second through hole 401 and the second shaft hole 1122 via the second shaft 60 to pivotally connect to one side of the cover plate 112. In the preferred embodiment of the present invention, The Spring 70 is elastically disposed in the second shaft 60, thereby providing elastic restoring force when the pulling handle 40 pivotally rotates relative to the cover plate 112.

Following above, the pulling handle 40 pivotally connects to one end of the cover plate 112, and a convex hook 41 is provided on the pulling handle 40. Besides, the moving key 50 movably connects to the cover plate 112, and the moving key 50 has a concave trough 51 at a side facing the pulling handle 40. The pulling handle 40 covers at a side of the cover plate away from the accommodating space 100 by the buckling of the convex hook 41 and the concave trough 51. However, the buckling type of the pulling handle 40 and the moving key 50 is not limited thereto when in practice.

In the preferred embodiment of the present invention, the cover plate 112 is formed with an elongated trough 1123. The moving key 50 has a convex pillar 52. The moving key 50 penetrates the elongated trough 1123 via the convex pillar 52 and is able to move in the elongated trough 1123, and thus being able to move relative to the cover plate 112. Preferably, one side of the cover plate 112 is formed with a second accommodating space 1124 for connecting to the moving key 50. A plurality of slots 1125 of the cover plate 112 are provided on the periphery of the second accommodating space 1124. Besides, the moving key 50 has a plurality of hooking elements 53. The moving key 50 buckles into the slot 1125 via the hooking element 53 and is able to move in the slot 1125, thereby movably connecting to the cover plate 112.

Figure 5:
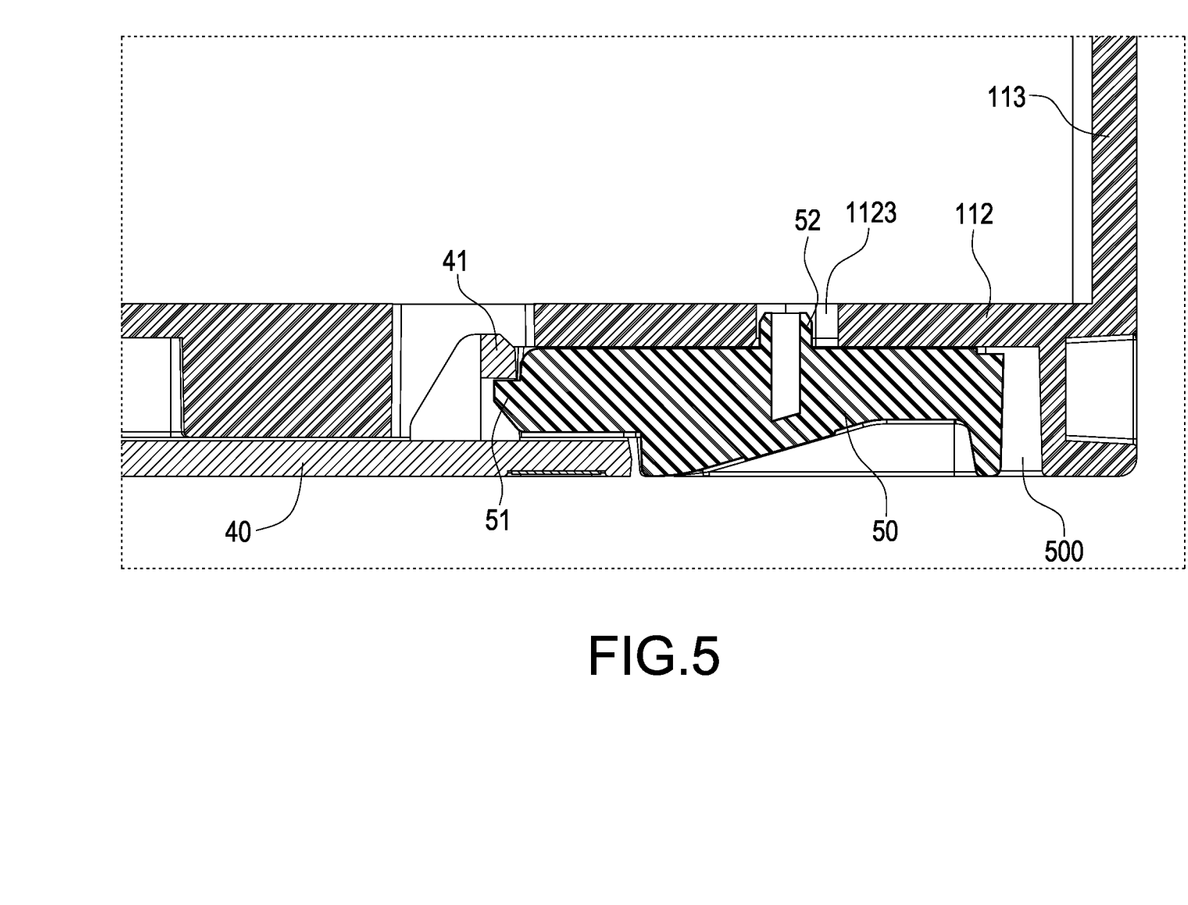
FIG. 5 is a sectional view of a buckling status of the pulling handle and the moving key of the preferred embodiment of the surrounding-buckle type mobile hard drive rack according to the present invention.
Figure 6:
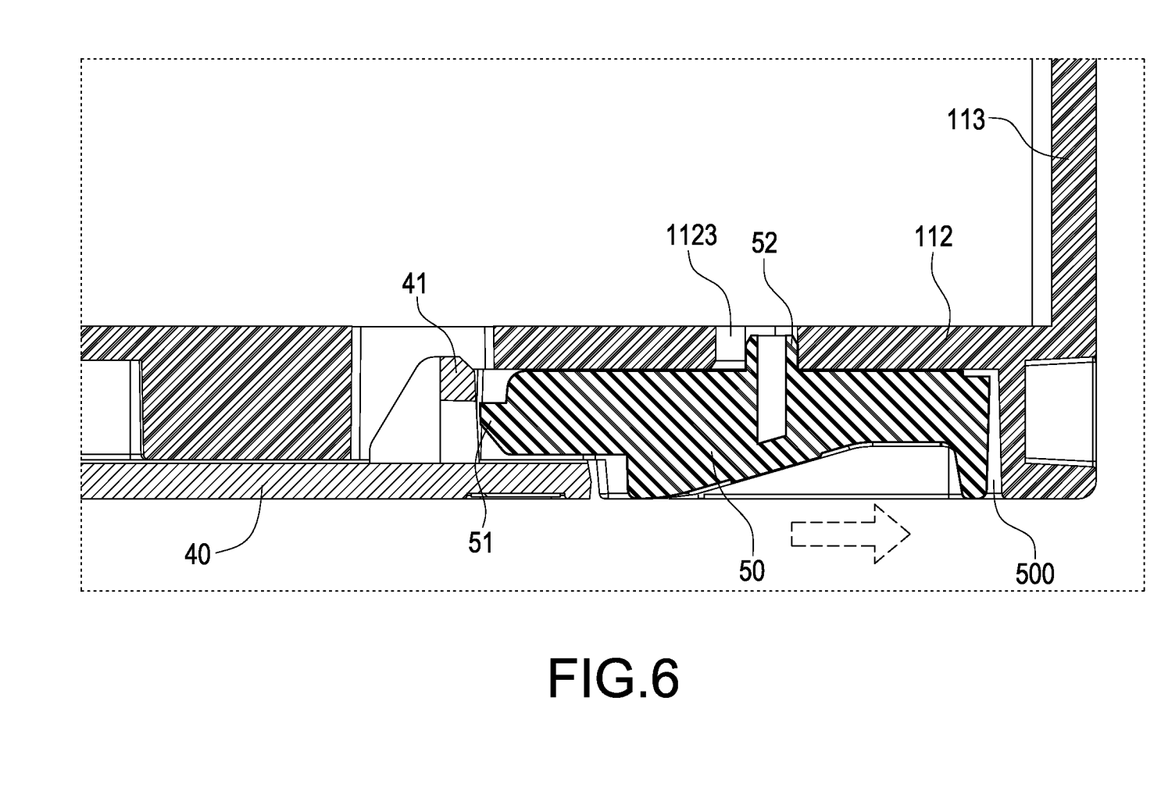
FIG. 6 is a sectional view of a unbuckling status of the pulling handle and the moving key of the preferred embodiment of the surrounding-buckle type mobile hard drive rack according to the present invention.

Please refer to FIGS. 5 and 6, after assembling the moving key 50 and the pulling handle 40 of the surrounding-buckle type mobile hard drive rack 1 to the cover plate 112 of the frame 10, the convex hook 41 of the pulling handle 40 will be bucked to the concave trough 51 of the moving key 50. According to FIG. 5, a gap 500 exists between the moving key 50 and the side of the cover plate 112, and the gap 500 can be used as a space for the moving key to move therein.

As embodied in FIG. 6, when the pulling handle 40 is going to be released, firstly the moving key 50 should be moved toward the gap 500. Meanwhile, the convex hook 41 of the pulling handle 40 will be disengaged from the concave trough 51, so that the pulling handle 40 can be released from the cover plate 112. And then, further operating the actuator assembly 20 to disengage the buckle arm 30 from the actuator assembly 20, and the buckle arm 30 can be rotated to expose the insertion opening 101, so as to facilitate the hard drive 2 to be moved out from the accommodating space 100 (shown in FIG. 9).

Figure 7:
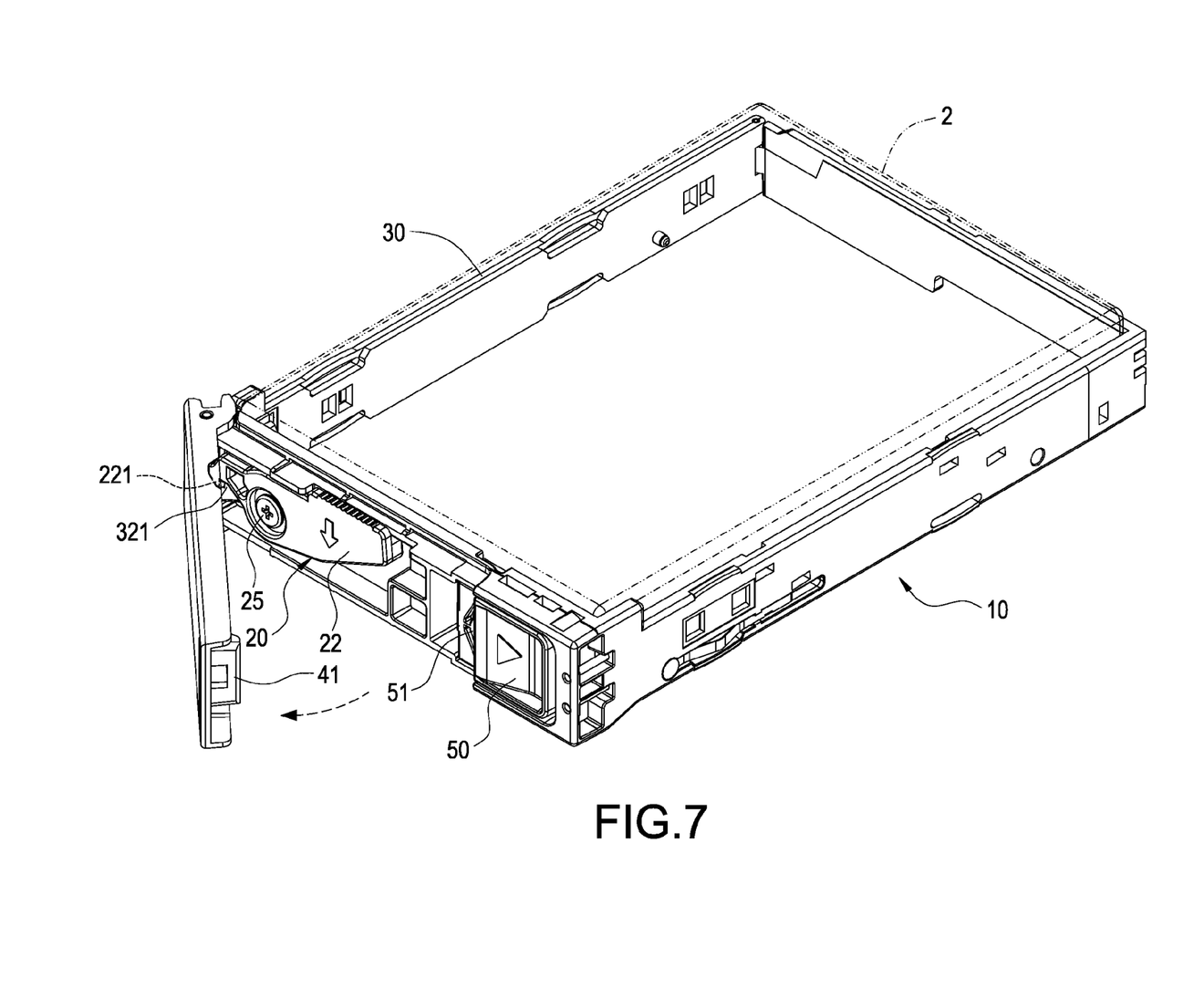
FIG. 7 is a schematic view of the pulling handle after being released in a preferred embodiment of the surrounding-buckle type mobile hard drive rack according to the present invention.
Figure 8:
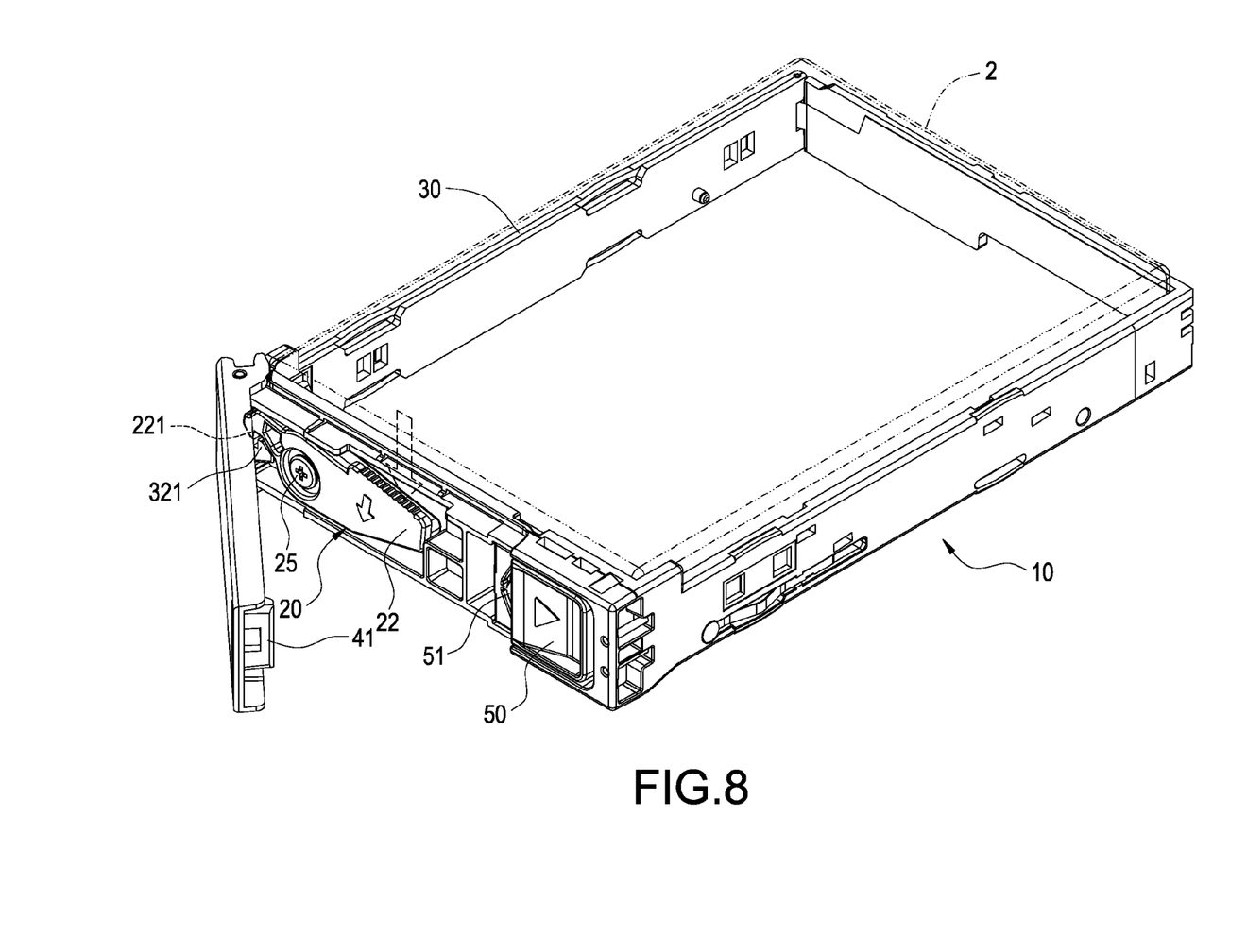
FIG. 8 is a schematic view of a preferred embodiment of the surrounding-buckle type mobile hard drive rack after pressing the latch arm to release the buckle arm according to the present invention.
Figure 9:
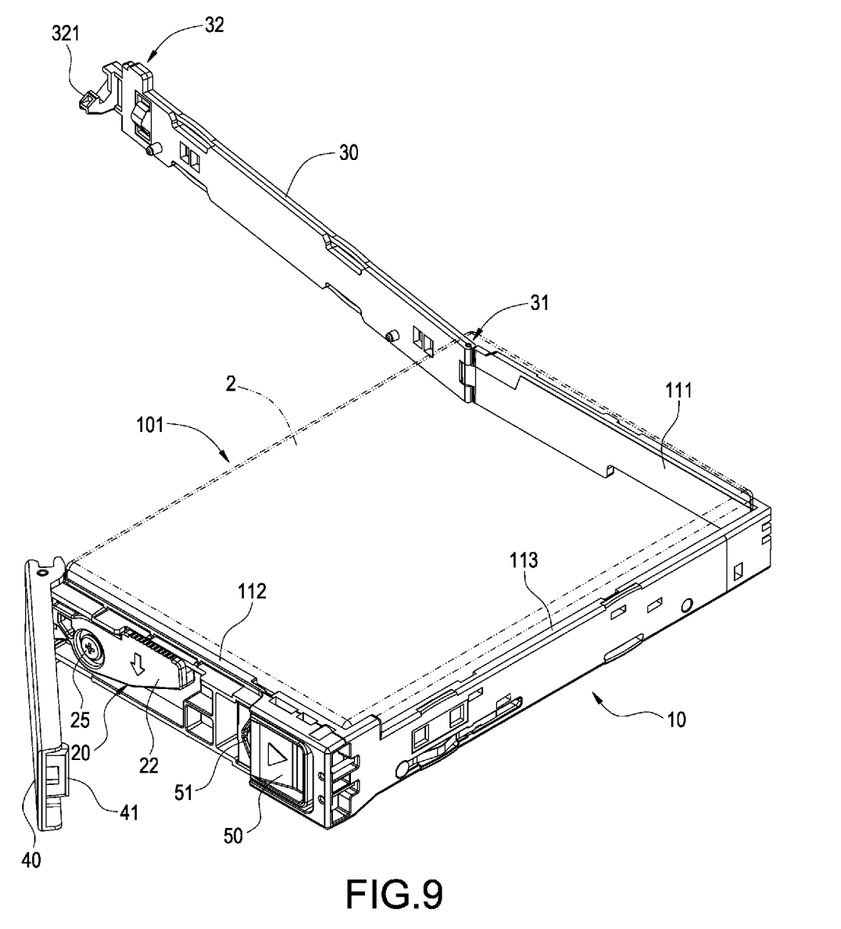
FIG. 9 is a schematic view of a preferred embodiment of the surrounding-buckle type mobile hard drive rack after buckle arm being released according to the present invention.

Please further refer to FIGS. 7-9, when the hard drive 2 of the surrounding-buckle type mobile hard drive rack 1 is going to be taken out, the pulling handle 40 needs to be rotated and released as shown above.

And then, please refer to FIG. 8, applying force to the latch arm 22 of the actuator assembly 20, the latch arm 22 will rotate along the screw 25 and drive the first buckle part 221 of the latch arm 22 to move upward, so as to unbuckle the first buckle part 221 and the second buckle part 321. As such, the buckle arm 20 unbuckles from the latch arm 22 and is able to rotate aside, and the insertion opening 101 (as shown in FIG. 9) can be exposed for taking out the hard drive 2.

It is noteworthy that, the accommodating space 100 of the frame 10 is a pierced compartment. When the hard drive 2 is accommodated into the accommodating space 100, the hard drive 2 can be fully exposed two opposite side surfaces. Since the frame 10 of the preferred embodiment of the present invention is a pierced frame, the thickness of the surrounding-buckle type mobile hard drive rack 1 can be reduced when the hard drive 2 is accommodated into the accommodating space 100, thereby allowing more surrounding-buckle type mobile hard drive racks 1 to be accommodated in the inner space of the server. Besides, since the frame 10 of the preferred embodiment of the present invention is a pierced frame which is good for ventilation, the heat dissipation efficiency of the hard drive 2 can be improved as well.

Besides, it is no need to press the latch arm 22 when the buckle arm 20 and the latch arm 22 are buckled to each other. The first buckle part 221 and the second buckle part 321 can be provided with a bevel respectively to be able to directly match and buckle to each other Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A surrounding-buckle type mobile hard drive rack for accommodating a hard drive, comprising:
    a frame including a plurality of plates, an accommodating space and at least one insertion opening being surrounded by the plurality of plates, the plurality of plates including a bottom plate and a cover plate disposed on opposite sides of the accommodating space, and a supporting plate connecting the bottom plate and the cover plate;
    an actuator assembly disposed on the cover plate, the actuator assembly including an elastic element and a latch arm being able to swing back-and-forth through the elastic element; a first buckle part being formed at one end of the latch arm;
    a buckle arm pivotally connected to a side of the frame, the buckle arm being provided with a pivotal end and a hooking end, the buckle arm pivotally connected to the bottom plate through the pivotal end to be able to rotate, a second buckle part being formed on the hooking end and selectively connected to the cover plate by buckling with the first buckle part; and
    a pulling handle and a moving key, the pulling handle pivotally connected to an end of the cover plate, the pulling handle being provided with a convex hook, the moving key movably connected to the cover plate and being formed with a concave trough on a side facing the pulling handle, the pulling handle covering the cover plate on a side away from the accommodating space by buckling the convex hook and the concave trough.

2. The surrounding-buckle type mobile hard drive rack according to claim 1, wherein the elastic element is a torsion spring.

3. The surrounding-buckle type mobile hard drive rack according to claim 1, wherein the first buckle part is a latching block, the second buckle part is a hook, the latching block and the hook have a bevel respectively.

4. The surrounding-buckle type mobile hard drive rack according to claim 1, further comprising a first shaft, the pivotal end of the buckle arm being provided with a first through hole, a first shaft hole being provided on the bottom plate at one end connected to the buckle arm, the first shaft being inserted into the first through hole and the first shaft hole.

5. The surrounding-buckle type mobile hard drive rack according to claim 1, wherein a first accommodating space is formed on the cover plate at a side connected to the actuator assembly, a stud is formed on the cover plate in the first accommodating space, the latch arm has a penetrating hole, the latch arm is movably connected to the cover plate by penetrating a screw through the penetrating hole and the stud.

6. The surrounding-buckle type mobile hard drive rack according to claim 1, wherein the cover plate is provided with an elongated trough, the moving key has a convex pillar and penetrates the elongated trough through the convex pillar to be able to move relative to the cover plate in the elongated trough.

7. The surrounding-buckle type mobile hard drive rack according to claim 6, wherein a side surface of the cover plate forms a second accommodating space for being connected with the moving key, and the cover plate is provided with a plurality of slots around a circumference of the second accommodating space, the moving key is provided with a plurality of hooking elements, the moving key buckles into the plurality of slots by the plurality of hooking elements and movably connected to the cover plate as well as moves in the plurality of slots.

8. The surrounding-buckle type mobile hard drive rack according to claim 1 further comprising a pair of second shafts, the cover plate being provided with a pair of second shaft holes at a side connecting the actuator assembly, a side of the pulling handle being provided with a pair of second through holes, the pulling handle being connected to the corresponding second through holes and the second shaft holes through the pair of second shaft so as to being pivotally connected to the cover plate.

9. The surrounding-buckle type mobile hard drive rack according to claim 8 further comprising a spring, the spring elastically disposed between the pair of the second shafts.

* * * * *